(12) United States Patent
Tsuchida

(10) Patent No.: US 9,160,574 B2
(45) Date of Patent: Oct. 13, 2015

(54) SIGNAL ADJUSTING DEVICE COMPRISING TERMINATION RESISTOR UNIT IN WHICH A SIGNAL LINE IS SUBJECTED TO TERMINATION

(71) Applicant: FANUC Corporation, Yamanashi (JP)

(72) Inventor: Kunio Tsuchida, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/313,804

(22) Filed: Jun. 24, 2014

(65) Prior Publication Data

US 2014/0375416 A1    Dec. 25, 2014

(30) Foreign Application Priority Data

Jun. 25, 2013   (JP) .................. 2013-132876

(51) Int. Cl.
G05B 1/06     (2006.01)
H04L 25/02    (2006.01)

(52) U.S. Cl.
CPC .................. H04L 25/0278 (2013.01)

(58) Field of Classification Search
CPC ...................................... H01C 10/00
USPC ............. 318/560, 652, 670, 400.01, 400.14, 318/400.15, 400.38, 400.4, 700, 701, 721, 318/799, 800, 823
See application file for complete search history.

(56) References Cited

U.S. PATENT DOCUMENTS 7,667,424 B2 *    2/2010   Tsuchiya .................. 318/652

FOREIGN PATENT DOCUMENTS

| JP | 4329310 A | 11/1992 |
|----|-----------|---------|
| JP | 2000122704 A | 4/2000 |
| JP | 2000171270 A | 6/2000 |
| JP | 2002199030 A | 7/2002 |
| JP | 2002305099 A | 10/2002 |
| JP | 2002315374 A | 10/2002 |
| JP | 2003194581 A | 7/2003 |
| JP | 2009-159256 A | 7/2009 |

* cited by examiner

Primary Examiner — Antony M Paul
(74) Attorney, Agent, or Firm — Hauptman Ham, LLP

(57) ABSTRACT

A detection signal receiving unit receives, via signal lines, a detection signal output from a position detector which is used in a motor control device. The resistance value of a termination resistor unit is changed to a resistance value determined depending on the type of the position detector in accordance with the received detection signal and the reference value determined depending on the type of the position detector.

7 Claims, 5 Drawing Sheets

SIGNAL ADJUSTING DEVICE COMPRISING TERMINATION RESISTOR UNIT IN WHICH A SIGNAL LINE IS SUBJECTED TO TERMINATION

CROSS-REFERENCE TO RELATED APPLICATIONS

This application is a new U.S. patent application that claims benefit of JP 2013-132876, filed on Jun. 25, 2013, the entire content of JP 2013-132876 is hereby incorporated by reference.

FIELD OF THE INVENTION

The present invention relates to a signal adjusting device for adjusting a detection signal which is output from a position detector to be used for a motor control device.

BACKGROUND OF THE INVENTION

A signal adjusting device for adjusting a signal when the signal is transmitted from a transmitting unit to a receiving unit via a signal line is known. In the signal adjusting device, a termination resistor unit in which a signal line is subjected to termination processing is connected to the signal line in order that an adverse effect such as variation of the amplitude of a signal, generation of a stepped signal waveform, distortion, turbulence, or the like of a signal due to reflection, or the like of the signal is not imposed on the signal.

For such a signal adjusting processing device, a signal adjusting device in which a termination resistor unit having a uniquely determined optimum resistance value is provided with respect to a transmitting unit which comprises in advance an internal processing circuit, an output buffer for outputting an processing result of the internal processing circuit to a signal line, and a code check bit insertion circuit provided therebetween, and in which the uniquely determined resistance value of the termination resistor unit is changed in accordance with the variation of a margin for a mask that an eye pattern opening has been proposed (for example, Japanese Unexamined Patent Publication No. JP-A-2009-159256).

In some cases, a position detector which is used for a motor control device and which detects the position of a motor can be connected to a receiving unit via a signal line, and a detection signal is transmitted from the connected position detector to the receiving unit via the signal line. In cases in which a signal line is subjected to a termination processing by using a termination resistor unit, an optimum resistance value of the termination resistor unit in order that adverse effect is not imposed on a detection signal differs depending on the type of the position detector to which the receiving unit is connected. For example, the optimum resistance value of a termination resistor unit in cases in which a position detector manufactured by a specified manufacturer is connected to a receiving unit differs from the optimum resistance value of a termination resistor unit in cases in which a position detector manufactured by another manufacturer is connected to a receiving unit.

Accordingly, it is difficult to set an optimum resistance value of a termination resistor unit with respect to a position detector connected to a receiving unit. Further, in order to set an optimum resistance value of the termination resistor unit for the position detector to which the receiving unit is connected, another resistor may be added to the termination resistor unit to omit some resistors included in the termination resistor unit, or a resistor included in the termination resistor unit may be changed to another resistor.

An object of the invention is to provide a signal adjusting device in which a resistance value of a termination resistor unit can be set to an appropriate value depending on the type of a position detector to which a receiving unit is connected without adding, omitting, or changing a resistor.

SUMMARY OF THE INVENTION

A signal adjusting device according to one Example of the invention is a signal adjusting device for adjusting a detection signal which is output from a position detector to be used for a motor control device, comprising: a detection signal receiving unit for receiving a detection signal via a signal line; and a termination resistor unit whose resistance value can be changed to a resistance value determined depending on the type of the position detector.

Preferably, a signal adjusting device according to another Example of the invention further comprises a resistance value changing unit in which the resistance value of the termination resistor unit is changed, in accordance with the received detection signal, to a resistance value determined depending on the type of the position detector.

Preferably, a signal adjusting device according to still another Example of the invention further comprises: a changed value setting unit in which a changed value of the resistance value is set in accordance with the received detection signal; and a resistance value changing unit in which a resistance value is changed by using the changed value.

Preferably, a signal adjusting device according to still another Example of the invention further comprises a changed value setting unit in which a changed value of the resistance value is set in accordance with the received detection signal, wherein the changed value setting unit outputs the changed value to a display device.

Preferably, the resistance value changing unit comprises a storage unit storing a changed value and changes a resistance value of the termination resistor unit by using the changed value stored in the storage unit.

Preferably, the changed value setting unit comprises a discrimination unit for discriminating the type of the position detector in order that a reference value depending on the type of the position detector is selected.

Preferably, the termination resistor unit comprises a variable resistor in which one end is connected to a signal line.

Preferably, the termination resistor unit comprises a first fixed resistor in which one end is connected to a signal line, and at least one stage including a second fixed resistor and a switch which connects or disconnects between the signal line and one end of the second fixed resistor.

Preferably, the termination resistor unit comprises a first fixed resistor in which one end is connected to a signal line, and at least one stage including a second fixed resistor and a short pin arranged between the signal line and one end of the second fixed resistor.

According to the invention, a signal adjusting device in which a resistance value of a termination resistor unit can be set to an appropriate value depending on the type of a position detector to which a receiving unit is connected without adding, omitting, or changing a resistor can be provided.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

First Embodiment

Figure 1:
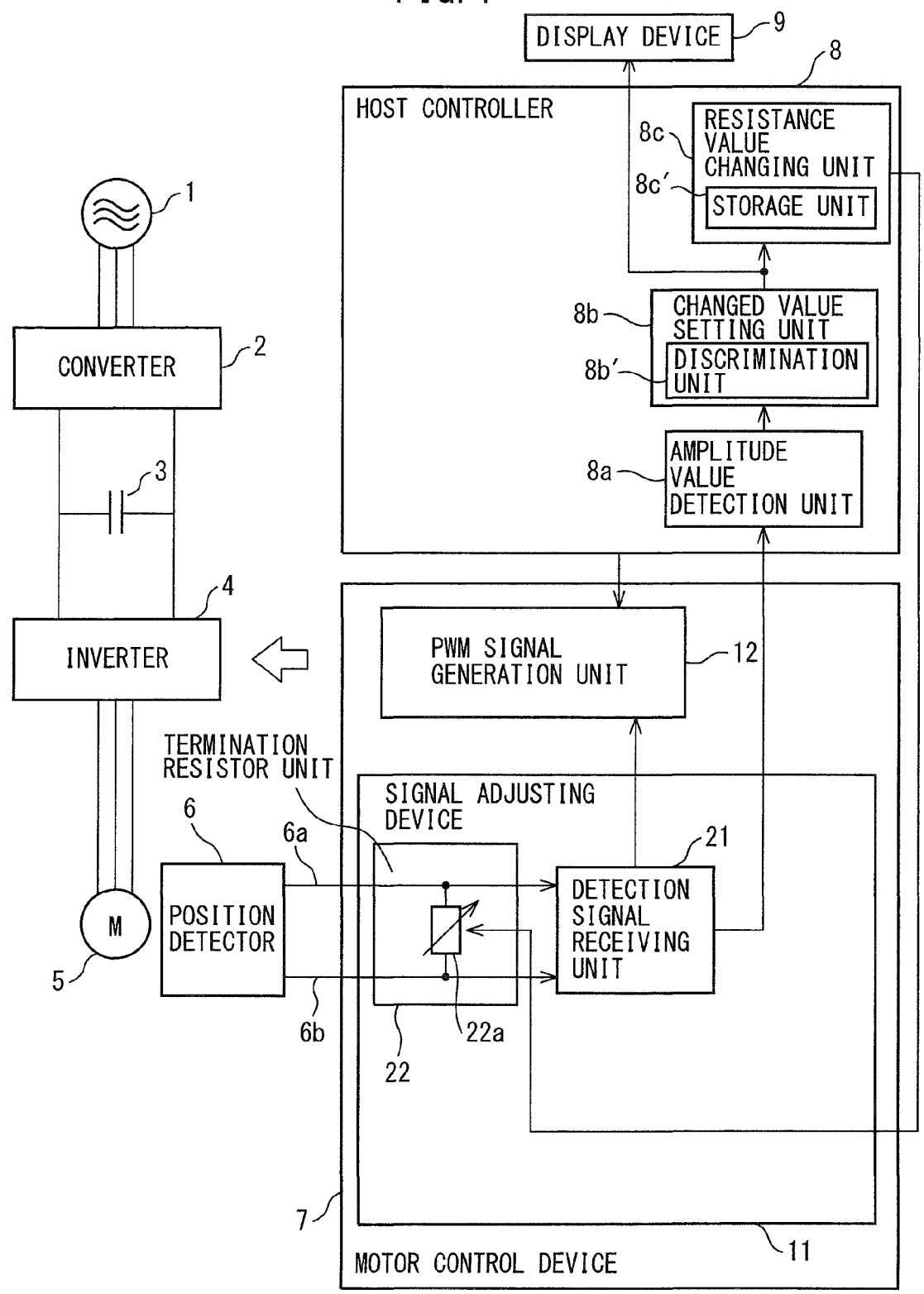
FIG. 1 is a block diagram of a system comprising a signal adjusting device according to a first embodiment of the invention.

An embodiment of a signal adjusting device of the invention will be described with reference to the Drawings. In the Drawings, like components have like numerals.

FIG. 1 is a block diagram of a system comprising a signal adjusting device according to a first embodiment of the invention. The system illustrated in FIG. 1 comprises a three-phase alternating-current power supply 1, a converter 2, a smoothing capacitor 3, an inverter 4, a servo motor 5, a position detector 6, a motor control device 7, a host controller 8, and a display device 9.

The three-phase alternating-current power supply 1 comprises a commercial alternating-current power supply. The converter 2 comprises, for example, a plurality of (six in the case of three-phase alternating-current) rectifier diodes and transistors each connected antiparallel to the rectifier diodes, and converts alternating-current power supplied from the three-phase alternating-current power supply 1 into direct-current power. The smoothing capacitor 3 is connected in parallel with the converter 2 in order to smooth a voltage rectified by the rectifier diode of the converter 2. The inverter 4 is connected in parallel with the smoothing capacitor 3, comprises, for example, a plurality of (six in the case of three-phase alternating-current) rectifier diodes and transistors each antiparallel connected to the rectifier diodes, and converts direct-current power converted by the converter 2 into alternating-current power by on/off operation of the transistor in accordance with a PWM signal described below.

The motor 5 comprises a rotary servo motor in which a permanent magnet is provided on either a rotor or a stator, a linear servo motor in which a permanent magnet is provided on either a stator or a slider, a vibration servo motor in which a permanent magnet is provided on either a stator or a vibrator, or the like.

The position detector 6 is used in the motor control device 7, comprises an encoder, a Hall element, a resolver or the like, and detects the position of the motor 5. In other words, the position detector 6 detects the position information of the motor 5, or the rotation angle of the motor 5, and outputs a detection signal (in this case, a differential signal) representing the rotation angle of the motor 5 to the motor control device 7 via two signal lines 6a, 6b.

The motor control device 7 performs a control such as a feedback control to the motor 5, and at the same time, performs adjustment of the detection signal which has been output from the position detector 6. For this purpose, the motor control device 7 comprises a signal adjusting device 11 and a PWM signal generation unit 12.

The signal adjusting device 11 performs adjustment of a detection signal which has been output from the position detector 6. For this purpose, the signal adjusting device 11 comprises a detection signal receiving unit 21 and a termination resistor unit 22. The detection signal receiving unit 21 receives, via the signal lines 6a, 6b, a detection signal which has been output from the position detector 6, and transmits the received detection signal to the host controller 8 and PWM signal generation unit 12 as it is or after multiplying the received detection signal by a prescribed constant (for example, 10).

The termination resistor unit 22 is connected to the signal lines 6a, 6b in order that the signal lines 6a, 6b are subjected to termination processing. The resistance value of the termination resistor unit 22 can be changed to a resistance value depending on the type of the position detector 6, in accordance with the amplitude value of the detection signal and the optimum resistance value in cases in which the position detector 6 is connected to the detection signal receiving unit 21 as a reference value determined depending on the type (for example, difference of manufacturer of the position detector) of the position detector 6.

In the present embodiment, the termination resistor unit 22 comprises a variable resistor 22a whose one end is connected to the signal line 6a and whose other end is connected to the signal line 6b.

The PWM signal generation unit 12 generates a PWM signal on the basis of the actual angle of the motor 5 represented by the detection signal and a command value of the angle of the motor 5 input from the host controller 8, and outputs the generated PWM signal to the inverter 4.

In the present embodiment, the motor control device 7 is realized by a processor comprising an input/output port, a serial communication circuit, an A/D converter, a counter, or the like, and executes a variety of processes according to a processing program stored in memory which is not illustrated.

The host controller 8 comprises a CNC (computer numerical control) or the like, generates a command value of the angle of the motor 5 by analyzing position data contained in a program, and outputs the generated command value of the angle of the motor 5 to the PWM signal generation unit 12. In the present embodiment, the host controller 8 comprises an amplitude value detection unit 8a, a changed value setting unit 8b, and a resistance value changing unit 8c.

To the amplitude value detection unit 8a, a detection signal received by the detection signal receiving unit 21 or a signal obtained by multiplying a detection signal received by the detection signal receiving unit 21 by a prescribed constant (for example, 10) is input from the detection signal receiving unit 21; the amplitude value detection unit 8a detects the amplitude value of the detection signal. For this purpose, the amplitude value detection unit 8a comprises an A/D converter which converts the detection signal into digital data per a prescribed sampling period (for example, 1 millisecond) and the like. The amplitude value detection unit 8a outputs the detected amplitude value to the changed value setting unit 8b.

The changed value setting unit 8b sets the resistance value of the termination resistor unit 22, or the changed value of the resistance value of the variable resistor 22a in accordance with the detection signal received by the detection signal receiving unit 21. In the present embodiment, to the changed value setting unit 8b, the amplitude value of the detection signal is input from the amplitude value detection unit 8a; the changed value setting unit 8b sets a changed value in accordance with the amplitude value and the optimum value of the amplitude value as a reference value determined depending on the type of the position detector 6.

For this purpose, the changed value setting unit 8b reads the optimum value of the amplitude value in the operation condition of the motor 5 (in other words, an amplitude value such that an adverse effect such as variation of the amplitude of the detection signal, generation of a stepped signal waveform, distortion, turbulence, or the like of a detection signal due to reflection, or the like of the detection signal is not imposed on the detection signal) from a memory (not illustrated), and calculates a changed value using the difference or ratio between the amplitude value detected by the amplitude value detection unit 8a and the optimum value of the amplitude value. Such calculation of a changed value is performed by using a table representing the relationship between the difference or ratio between the detected amplitude value and the optimum value of the amplitude value and the changed value which is set for each type of the position detector 6.

In the present embodiment, the changed value setting unit 8b comprises a discrimination unit 8b' in which the type of the position detector 6 and the amplitude value of the detection signal are discriminated in accordance with the variation pattern of digital data (corresponding to the waveform pattern of a detection signal differing depending on the type of the position detector 6) which is output by the amplitude value detection unit 8a in a specified operation condition of the motor 5 (for example, the number of revolution of the motor: 50 revolutions per one second). By using this, the changed value setting unit 8b selects the optimum value of the amplitude value corresponding to the discriminated type of the position detector 6 from a plurality of optimum values of the amplitude values stored in the above-described memory in accordance with the discriminated type of the position detector 6. Then, the changed value setting unit 8b outputs the changed value calculated using the detected amplitude value and the selected optimum value of the amplitude value to the resistance value changing unit 8c and a display device 9.

The resistance value changing unit 8c changes the resistance value of the termination resistor unit 22, or the resistance value of the variable resistor 22a to a resistance value determined depending on the type of the position detector 6 in accordance with the detection signal received by the detection signal receiving unit 21. In the present embodiment, in the resistance value changing unit 8c, a changed value is input from the resistance value changing unit 8c, and the resistance value of the termination resistor unit 22, or the resistance value of the variable resistor 22a is changed to the optimum resistance value in cases in which the position detector 6 is connected to the detection signal receiving unit 21 by using the changed value. For this purpose, the resistance value changing unit 8c sets the resistance value of the termination resistor unit 22 to a preset resistance value (for example, 10Ω), and sets a value obtained by adding the changed value to the preset resistance value, or by subtracting the changed value from the preset resistance value to the optimum resistance value in cases in which the position detector 6 is connected to the detection signal receiving unit 21.

In the present embodiment, the resistance value changing unit 8c comprises a storage unit 8c' storing a changed value which is set depending on the type of the position detector 6, and changes the resistance value of the termination resistor unit 22 by using the changed value stored in the storage unit 8c'. The changed value which is set depending on the type of the position detector 6 is stored in the storage unit 8c'. In cases in which the position detector 6 connected to the detection signal receiving unit 21 is not changed to another type of position detector, the changed value setting unit 8b does not set the changed value even when the amplitude value detection unit 8a detects the amplitude value of the detection signal. The use of the changed value stored in the storage unit 8c' to change the resistance value of the termination resistor unit 22 eliminates the need of resetting the changed value every time the motor control device 7 is started.

The display unit 9 comprises an LCD to which a changed value is input from the changed value setting unit 8b and which displays the input changed value, or the like.

The operation of the present embodiment will be described. First, the resistance value changing unit 8c sets the resistance value of the termination resistor unit 22 to a preset resistance value (for example, 10Ω), and the host controller 8 outputs the command value of the angle of the motor 5 to the PWM signal generation unit 12 such that the number of revolution of the motor 5 per a predetermined time (for example, one second) is a constant number of revolution (for example, 50 revolutions).

Subsequently, the detection signal receiving unit 21 receives a detection signal from the position detector 6, and outputs the received detection signal to the amplitude value detection unit 8a. Then, the amplitude value detection unit 8a detects the amplitude value of the detection signal, and inputs the detected amplitude value to the changed value setting unit 8b. After that, the discrimination unit 8b' included in the changed value setting unit 8b judges whether the input amplitude value corresponds to the optimum value of the amplitude value.

When the input amplitude value corresponds to the optimum value of the amplitude value, the changed value setting unit 8b does not output a changed value to the resistance value changing unit 8c. In contrast, when the input amplitude value does not correspond to the optimum value of the amplitude value, the changed value setting unit 8b calculates a changed value, and outputs the calculated changed value to the resistance value changing unit 8c. Then, the resistance value changing unit 8c stores the changed value in the storage unit 8c', and changes the resistance value of the termination resistor unit 22 to the optimum resistance value in the case in which the position detector 6 is connected to the detection signal receiving unit 21 by using the changed value stored in the storage unit 8c'.

According to the present embodiment, even when the transmission characteristics of the position detector 6 change since the type of the position detector 6 connected to the detection signal receiving unit 21 cannot be determined in advance, the resistance value of the termination resistor unit 22 is changed to the optimum resistance value depending on the type of the position detector 6. For this purpose, the resistance value of the termination resistor unit 22 can be set to an appropriate value depending on the type of the position detector 6 connected to the detection signal receiving unit 21 without adding, omitting, or changing a resistor. Further, when the resistance value of the termination resistor unit 22 is set to an appropriate value, an adverse effect such as variation of the amplitude of a detection signal, generation of a stepped signal waveform, distortion, turbulence, or the like of a detection signal due to reflection, or the like of the detection signal is not imposed on the signal.

Second Embodiment

Figure 2:
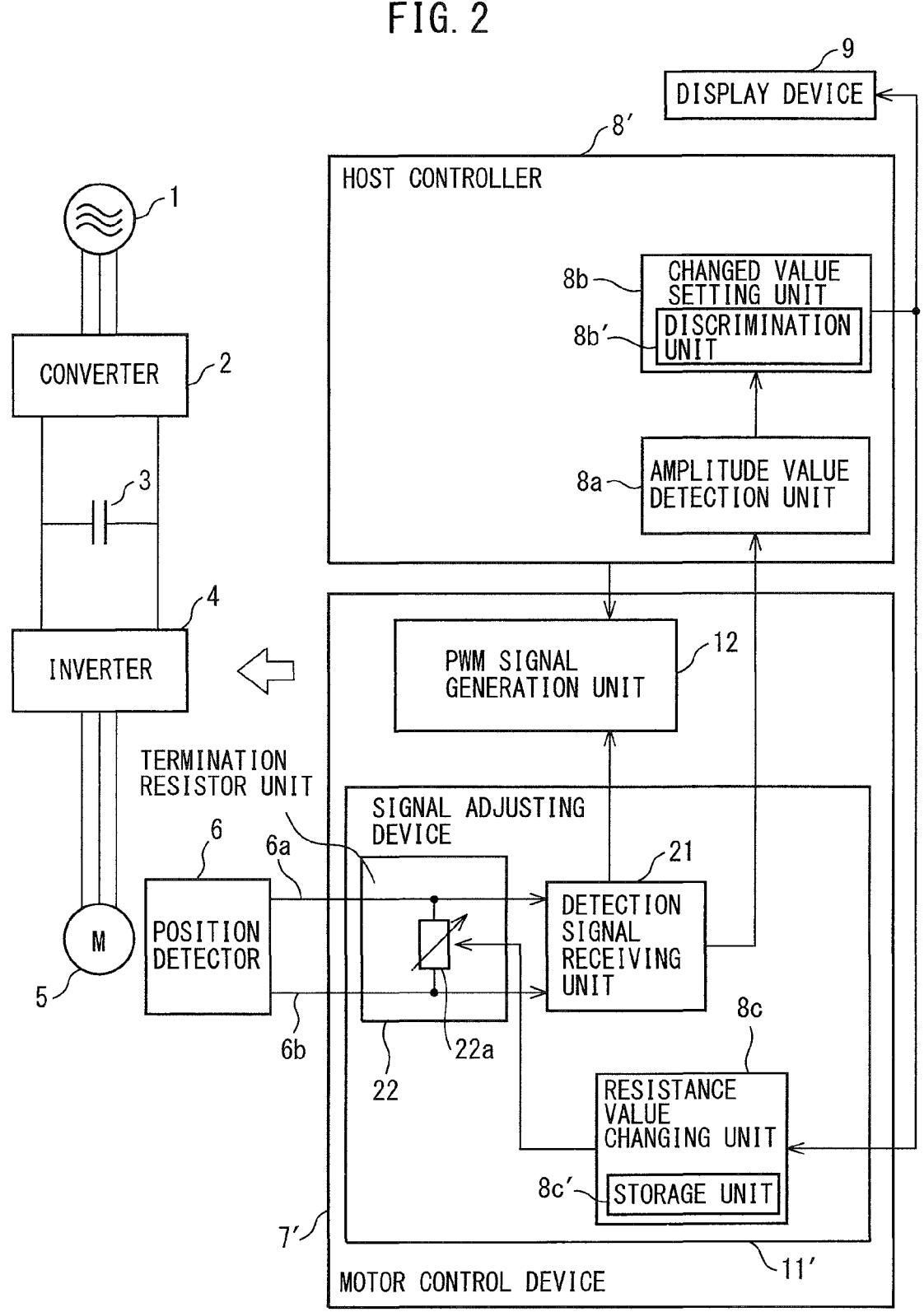
FIG. 2 is a block diagram of a system comprising a signal adjusting device according to a second embodiment of the invention.

FIG. 2 is a block diagram of a system comprising a signal adjusting device according to a second embodiment of the invention. In FIG. 2, a signal adjusting device 11' included in a motor control device 7' comprises the detection signal receiving unit 21 and termination resistor unit 22 and further comprises the resistance value changing unit 8c; a host controller 8' comprises the amplitude value detection unit 8a and changed value setting unit 8b, but does not comprise the resistance value changing unit 8c. As illustrated in FIG. 2, the resistance value changing unit 8c may be provided in the signal adjusting device 11' instead of in the host controller 8'.

Third Embodiment

Figure 3:
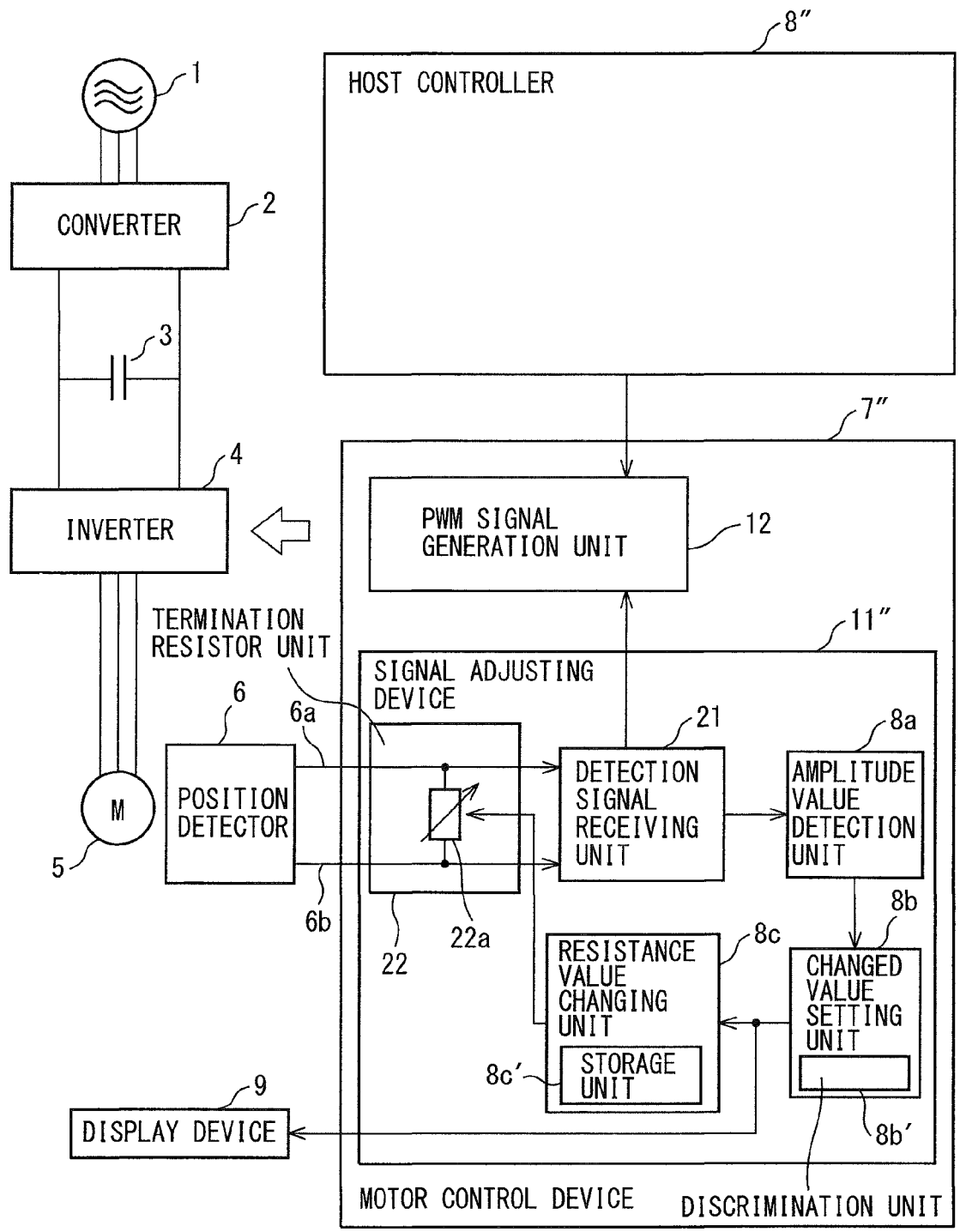
FIG. 3 is a block diagram of a system comprising a signal adjusting device according to a third embodiment of the invention.

FIG. 3 is a block diagram of a system comprising a signal adjusting device according to a third embodiment of the invention. In FIG. 3, a signal adjusting device 11" included in motor control device 7" comprises the detection signal receiving unit 21 and termination resistor unit 22 and further comprises the amplitude value detection unit 8a, changed value setting unit 8b and resistance value changing unit 8c; a host controller 8" does not comprise the amplitude value detection unit 8a, changed value setting unit 8b and resistance value changing unit 8c. As illustrated in FIG. 3, the amplitude value detection unit 8a, changed value setting unit 8b and resistance value changing unit 8c may be provided in the signal adjusting device 11" instead of in the host controller 8". In the present embodiment, the changed value setting unit 8b judges the operation state (operation condition) of the motor 5 in accordance with the command value of the angle of the motor 5 input from the host controller 8.

Figure 4:
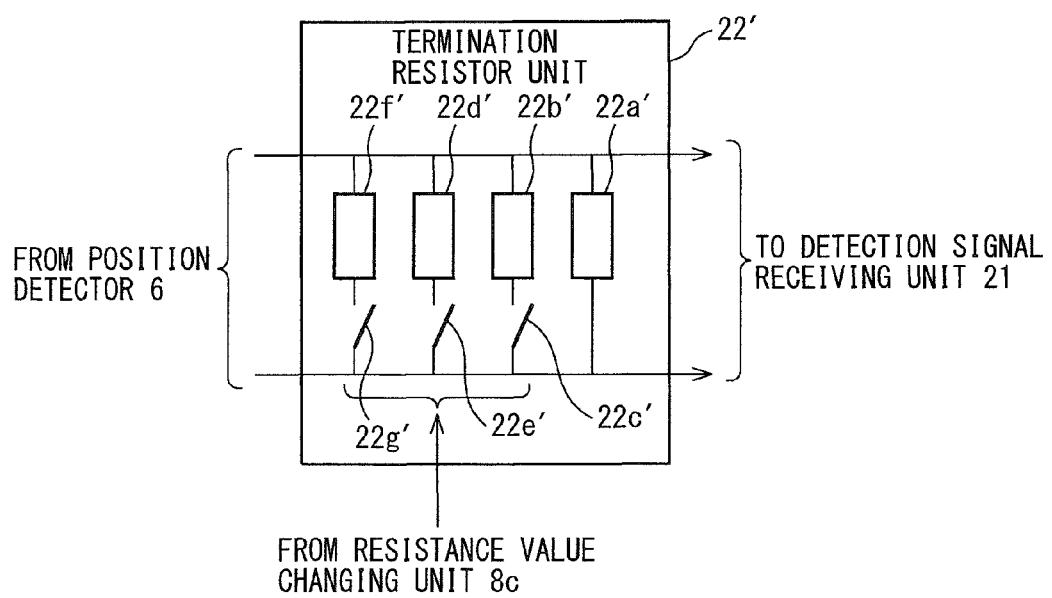
FIG. 4 is a circuit diagram of another example of the termination resistor unit illustrated in FIGS. 1 to 3.

FIG. 4 is a circuit diagram of another example of the termination resistor units illustrated in FIGS. 1 to 3. In FIG. 4, a termination resistor unit 22' comprises: a fixed resistor 22a' in which one end is connected to the signal line 6a and in which other end is connected to the signal line 6b as a first fixed resistor; a first stage comprising a fixed resistor 22b' in which one end is connected to the signal line 6a and a switch 22c' performing connection and disconnection between the other end of the fixed resistor 22b' and the signal line 6b; a second stage comprising a fixed resistor 22d' in which one end is connected to the signal line 6a and a switch 22e' performing connection and disconnection between the other end of the fixed resistor 22d' and the signal line 6b; and a third stage comprising a fixed resistor 22f' in which one end is connected to the signal line 6a and a switch 22g' performing connection and disconnection between the other end of the fixed resistor 22f' and the signal line 6b.

In this case, in order to change the resistance value of the termination resistor unit 22' to the optimum resistance value in the case in which the position detector 6 is connected to the detection signal receiving unit 21, each of the switches 22c', 22e', 22g' performs connection and disconnection between the other end of each of the fixed resistors 22b', 22d', 22f' and the signal line 6b in accordance with a change command of the resistance value of the termination resistor unit 22' by the resistance value changing unit 8c. Further, the resistance values of the fixed resistor 22b', 22d', 22f' may all be the same, or some of these are the same, or all of these are different from one another.

Fourth Embodiment

Figure 5:
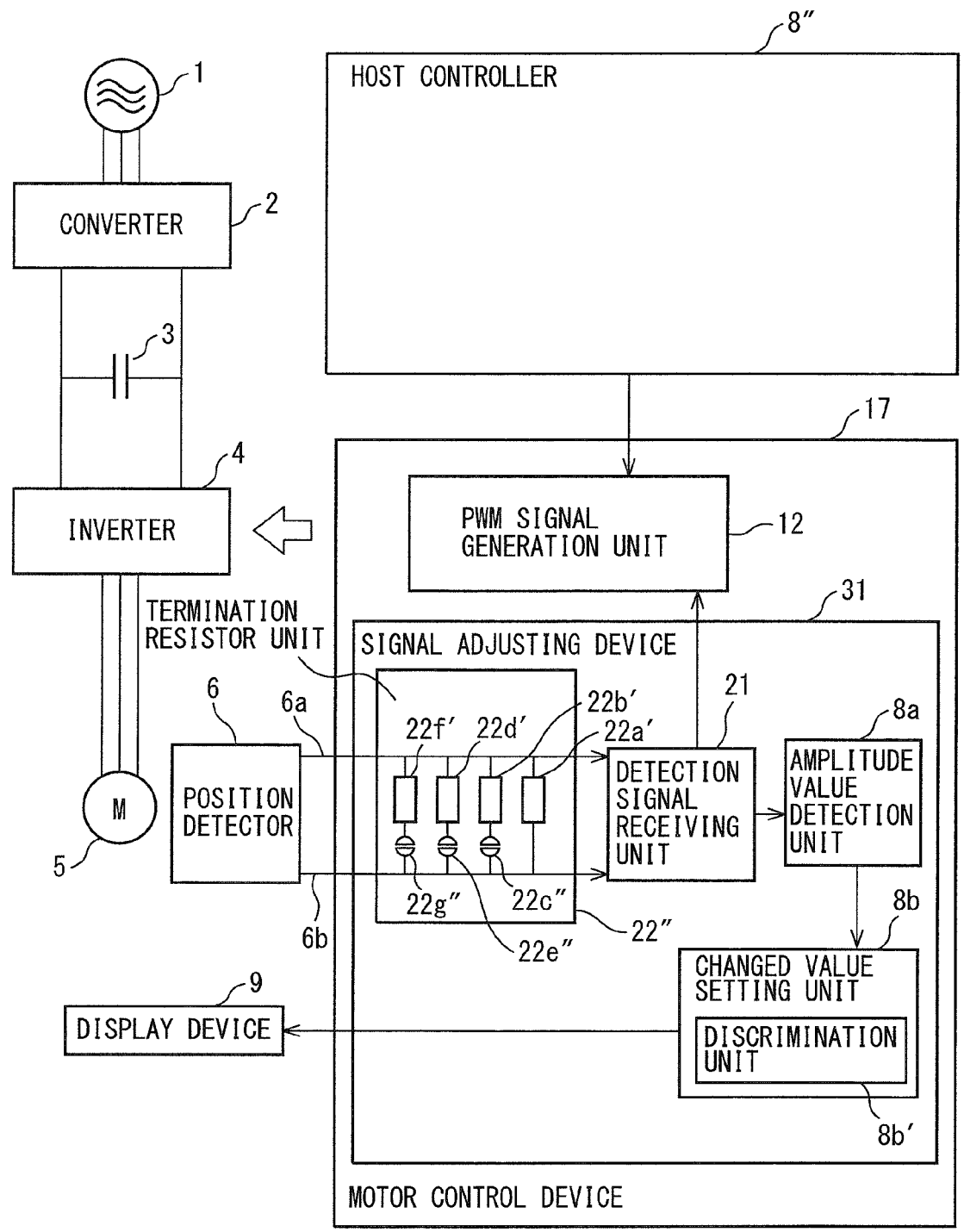
FIG. 5 a block diagram of a system comprising a signal adjusting device according to a fourth embodiment of the invention.

FIG. 5 is a block diagram of a system comprising a signal adjusting device according to a fourth embodiment of the invention. In FIG. 5, a signal adjusting device 31 included in a motor control device 17 comprises the detection signal receiving unit 21 and further comprises the amplitude value detection unit 8a, the changed value setting unit 8b and a termination resistor unit 22".

The termination resistor unit 22" comprises: the fixed resistor 22a'; a first stage including a fixed resistor 22b' whose one end is connected to the signal line 6a and a short pin 22c'" arranged between the other end of the fixed resistor 22b' and the signal line 6b; a second stage including a fixed resistor 22d' whose one end is connected to the signal line 6a and a short pin 22e'" arranged between the other end of the fixed resistor 22d' and the signal line 6b; and a third stage including a fixed resistor 22f' whose one end is connected to the signal line 6a and a short pin 22g'" arranged between the other end of the fixed resistor 22f' and the signal line 6b.

In this case, in order to change the resistance value of the termination resistor unit 22" to an optimum resistance value in the case in which the position detector 6 is connected to the detection signal receiving unit 21, at least one of the short pins 22c'", 22e'", 22g'" is short-circuited in accordance with the changed value displayed on the display device 9.

The invention is not limited to the above-described embodiments, and can be changed or modified in a variety of ways. For example, although, in the above-described embodiments, cases in which the signal adjusting device of the invention is provided in a motor control device are described, the signal adjusting device of the invention can be provided outside the motor control device.

Further, although, in the above-described embodiments, cases in which a differential signal is used as a detection signal are described, the invention can also be applied to cases in which a signal other than a differential signal is used as a detection signal (in other words, cases in which one end of a termination resistor unit is connected to a signal line and the other end thereof is connected to a ground)

Further, a waveform detection unit detecting the waveform of a detection signal received by a detection signal receiving unit may be provided instead of the amplitude value detection unit. In this case, the changed value setting unit sets a changed value of the resistance value of the termination resistor unit in accordance with the waveform detected by the waveform detection unit and the reference waveform determined depending on the type of the position detector, or alternatively, a resistance value changing unit changes the resistance value of the termination resistor unit to a resistance value determined depending on the type of the position detector in accordance with the waveform detected by the waveform detection unit and the reference waveform determined depending on the type of the position detector.

Further, even after the resistance value of the termination resistor unit is changed to an optimum resistance value in the case in which the position detector is connected to the detection signal receiving unit, a change command of the resistance value of the termination resistor unit by the resistance value changing unit in order to finely adjust the resistance value of the termination resistor unit can also be repeated.

What is claimed is:

1. A signal adjusting device for adjusting a detection signal which is output from a position detector to be used for a motor control device, comprising:
    a detection signal receiving unit for receiving a detection signal via a signal line; and
    a termination resistor unit which is connected to a signal;
    a changed value setting unit in which a changed value of a resistance value of the termination resistor unit is set in accordance with an amplitude value of the detection signal received by the detection signal receiving unit and an amplitude value as a reference value determined depending on a type of a position detector; and
    a resistance value changing unit in which the resistance value is changed by using the changed value.

2. The signal adjusting device according to claim 1, further comprising wherein the changed value setting unit outputs the changed value to a display device.

3. The signal adjusting device according to claim 2, wherein the termination resistor unit comprises:
   a first fixed resistor whose one end is connected to a signal line; and
   at least one stage including a second fixed resistor and a short pin arranged between the signal line and one end of the second fixed resistor.

4. The signal adjusting device according to claim 1, wherein the resistance value changing unit comprises a storage unit storing a changed value and changes a resistance value of the termination resistor unit by using the changed value stored in the storage unit.

5. The signal adjusting device according to claim 1, wherein the changed value setting unit comprises a discrimination unit for discriminating the type of the position detector in order that an optimum value of the amplitude value as a reference value depending on the type of the position detector is selected from a plurality of optimum values of the amplitude values stored in a storage unit.

6. The signal adjusting device according to claim 1, wherein the termination resistor unit comprises a variable resistor whose one end is connected to a signal line.

7. The signal adjusting device according to claim 1, wherein the termination resistor unit comprises:
   a first fixed resistor whose one end is connected to a signal line; and
   at least one stage including a second fixed resistor and a switch which connects or disconnects between the signal line and one end of the second fixed resistor.

* * * * *